Figures 6, 7:
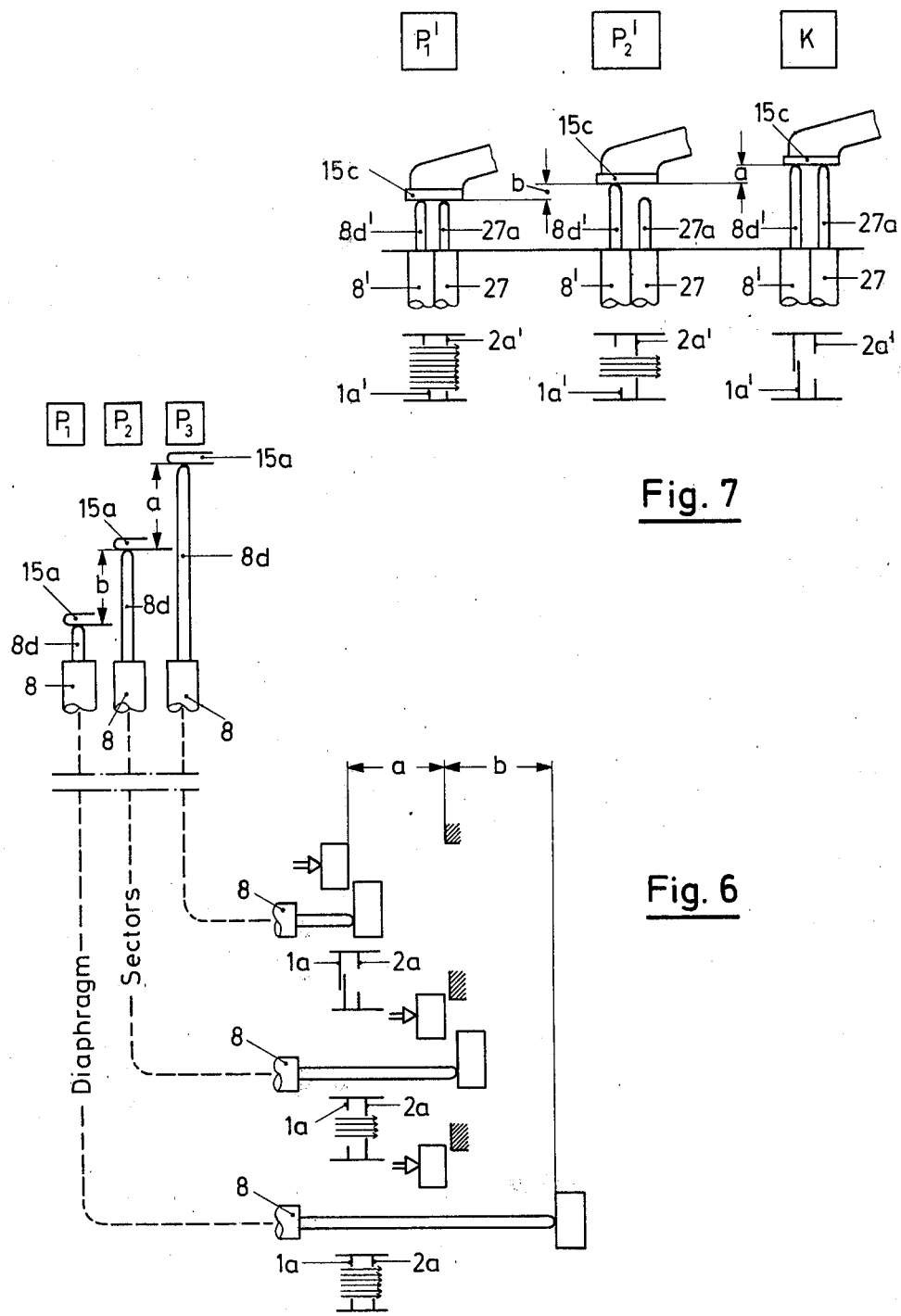

United States Patent [19]

Starp et al.

[11] 4,339,192
[45] Jul. 13, 1982

[54] CABLE RELEASE ATTACHABLE TO A CAMERA SHUTTER

[76] Inventors: Franz Starp, Mittlere Steige 36; Dieter Rittmann, Calwerstrasse 53, both of 7547 Wildbad 5, Fed. Rep. of Germany

[21] Appl. No.: 286,190

[22] Filed: Jul. 23, 1981

[30] Foreign Application Priority Data

Jul. 26, 1980 [DE] Fed. Rep. of Germany ....... 3028431
Jul. 26, 1980 [DE] Fed. Rep. of Germany ....... 3028465
Apr. 4, 1981 [DE] Fed. Rep. of Germany ....... 3113643

[51] Int. Cl.³ .................... G03B 9/02; G03B 17/26; G03B 17/38
[52] U.S. Cl. .................... 354/269; 354/272; 354/276
[58] Field of Search ............... 354/269, 272, 276, 230, 354/232

[56] References Cited

U.S. PATENT DOCUMENTS

1,741,526 12/1929 Kühl ........................ 354/269 X
3,590,717 7/1971 Raab ........................ 354/269 X
3,780,636 12/1973 Klupsch et al. .............. 354/269

FOREIGN PATENT DOCUMENTS

1290804 3/1969 Fed. Rep. of Germany ...... 354/269

*Primary Examiner*—Donald A. Griffin

[57] ABSTRACT

Cable release arrangement which is connectable to the shutter of a camera, comprising two flexible power transmitting members which are provided, at one corresponding end, with an actuating handle formed as a common housing, and, at the other corresponding end, with a threaded connection, one transmitting member being used to release the shutter and the other transmitting member being used to actuate the diaphragm blades and/or the shutter segments for the purpose of viewing through the camera shutter, wherein the transmitting member for effecting shutter release is actuatable by direct finger pressure upon an axially displaceably mounted push rod therefor, whereas the transmitting member which acts upon the diaphragm blades and/or the shutter segments is actuatable indirectly by way of a switching device which progressively displaces its axially displaceably mounted push rod, and wherein the corresponding end pieces of the two transmitting members which guide the rods respectively, are combined in said housing which accordingly serves to accommodate the switching device and also fulfils the function of such actuating handle;

preferably with the switching device being separately actuatable by an automatic cassette cable upon insertion of a film cassette in the camera, and having a releasable switch lock, especially a lock which is automatically released upon such cassette insertion; and a progressive actuating device actuated by a cable release for opening the shutter system and moving the diaphragm system to fully open aperture position for said purpose of viewing.

16 Claims, 14 Drawing Figures

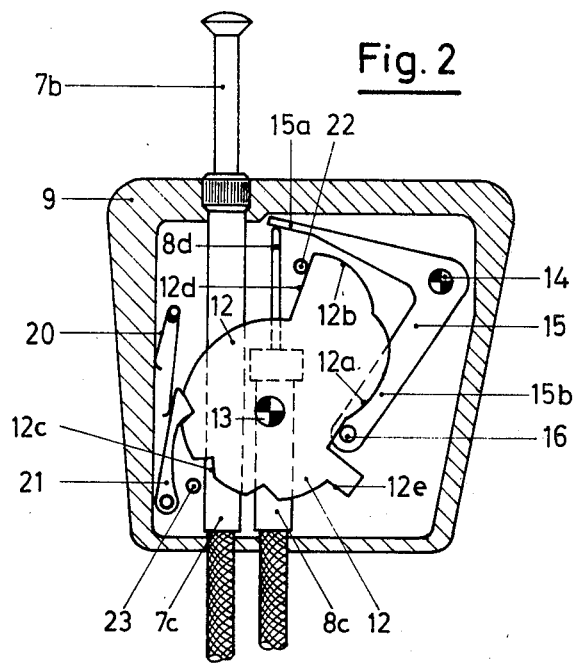
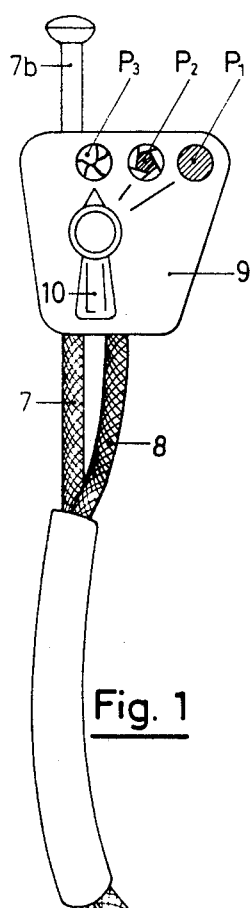
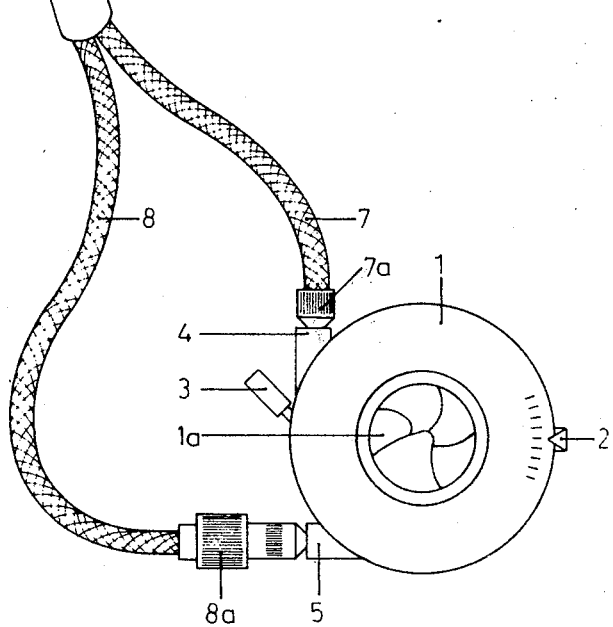

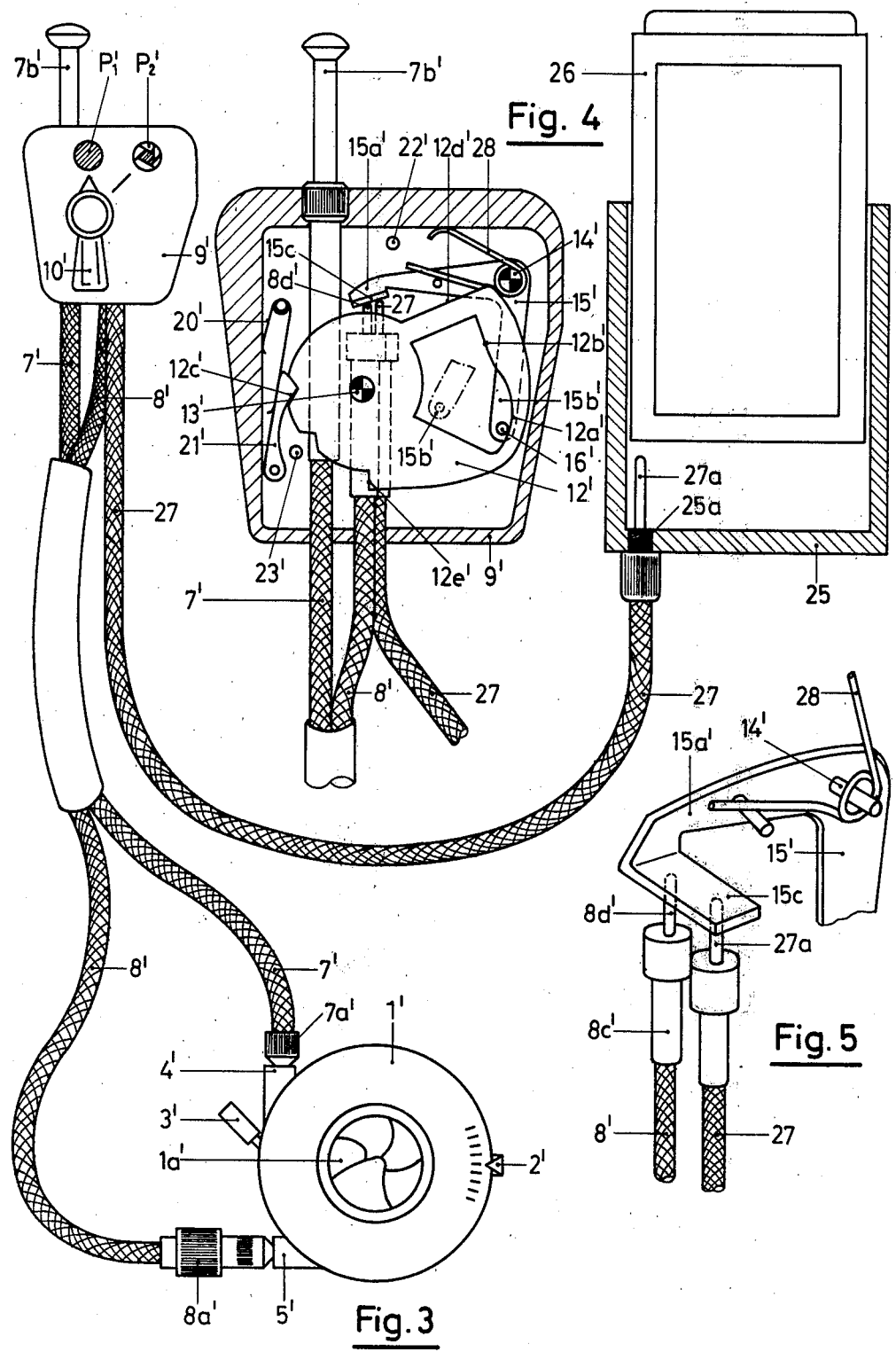

CABLE RELEASE ATTACHABLE TO A CAMERA SHUTTER

The present invention relates to a cable release arrangement or combination, which is connectable to the shutter of a camera, especially a professional camera, comprising two flexible power transmitting members which are provided, at one end, with an actuating handle and, at the other end, with a threaded connection, one said power transmitting member being used to release the shutter and the other power transmitting member being used to actuate the diaphragm blades and/or the shutter segments for the purpose of intermediate viewing through the camera shutter.

The present invention also relates to a releasably lockable switching device for actuating the shutter segments and/or diaphragm blades under the control of a cassette cable which is actuated upon insertion of a film cassette in a film cassette accommodating lens carried of the camera; as well as to a shutter having a cable release actuated progressive actuating device for opening the shutter segment system and moving the diaphragm blade system to fully open aperture position.

Cable release combinations or arrangements as such are known. They are mainly provided as double releases which, in practice, are used inter alia to actuate two different appliances synchronously. In addition, such double cable releases are often also used in reflex cameras for the purpose of actuating the spring diaphragm mechanism and the shutter release mechanism, whereby, in the event of actuating the finger release push rod, one power transmitting member sets the spring diaphragm mechanism operated diaphragm blades to an aperture width or size corresponding to the preselected value and the other power transmitting member subsequently releases the camera shutter.

Since, with these known cable release combinations, the two power transmitting members are actuated by one finger push rod, i.e. always by one and the same component, the possible applications of such combinations are restricted to use with appliances or other devices whose actuation has to effected simultaneously or successively in a single operation. The restrictions to specific spheres of application also result from the fact that it is not always possible to design the actuating rod of a double cable release so that it can be easily assigned to different purposes.

Cable release combinations are also known which differ in principle from the above-mentioned combinations in that two or more cable releases are not combined into one common handle, but are designed so that each cable release is individually connected with its respective remote end to an appliance, and whereby the release is used to transmit switching and/or actuating pulses from one appliance to another.

It is among the objects and advantages of the present invention to overcome the foregoing drawbacks and to provide a cable release arrangement or combination, which is easy to handle, for photograhic cameras of the first mentioned type, but whose two cable releases or power transmitting members are combined in one common operating housing or handle and yet which can be used independently of each other and be easily assignable to their various separate intended purposes.

It is among the additional objects and advantages of the present invention to provide a cable release arrangement for the shutter of such a camera which contemplates a releasably lockable switching device for actuating the shutter segments and/or the diaphragm blades under the control of a cassette cable which is actuated upon insertion of a film cassette in a film cassette accommodating lens carrier or rear lens carrier frame or the like of the camera.

It is among the further objects and advantages of the present invention to provide a camera shutter arrangement having a cable release actuated progressively actuating device for opening the shutter segment system and moving the diaphragm blade system to fully open aperture position for the purpose of viewing the field of the camera, e.g. on the ground glass focussing screeen thereof.

Figure 8:
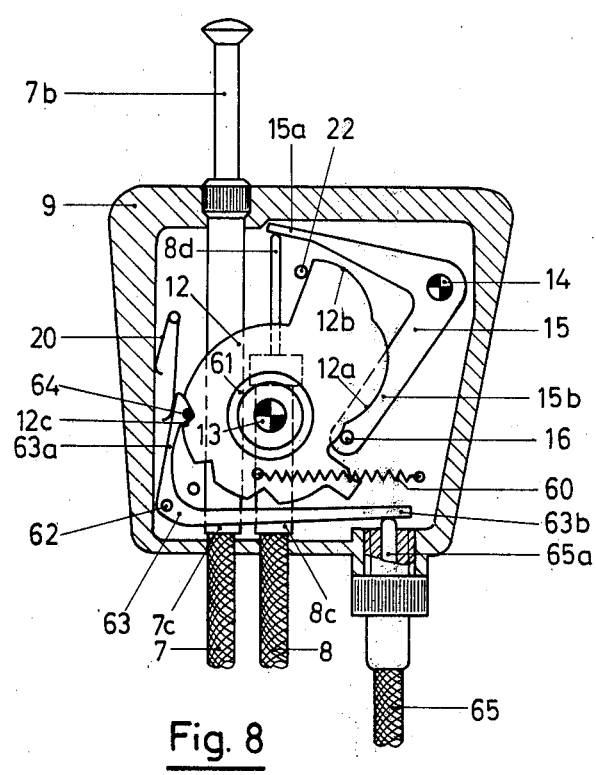
Figure 9:
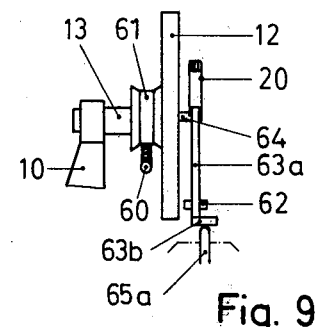
Figure 10:
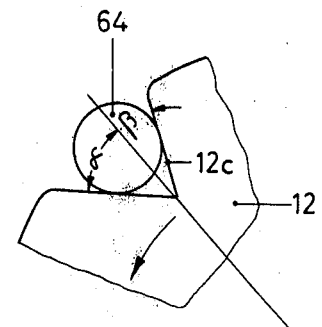
Figure 11:
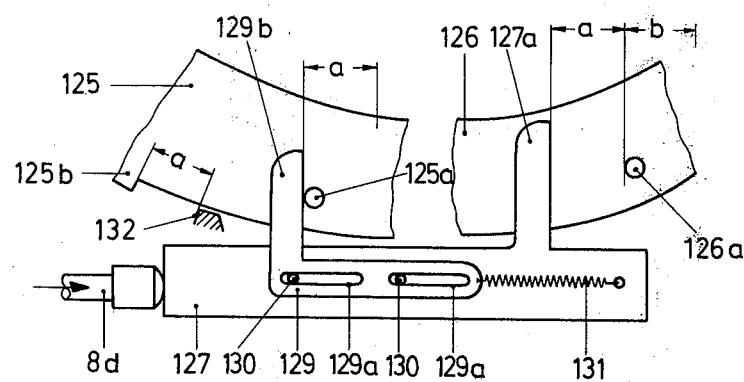
Figure 12:
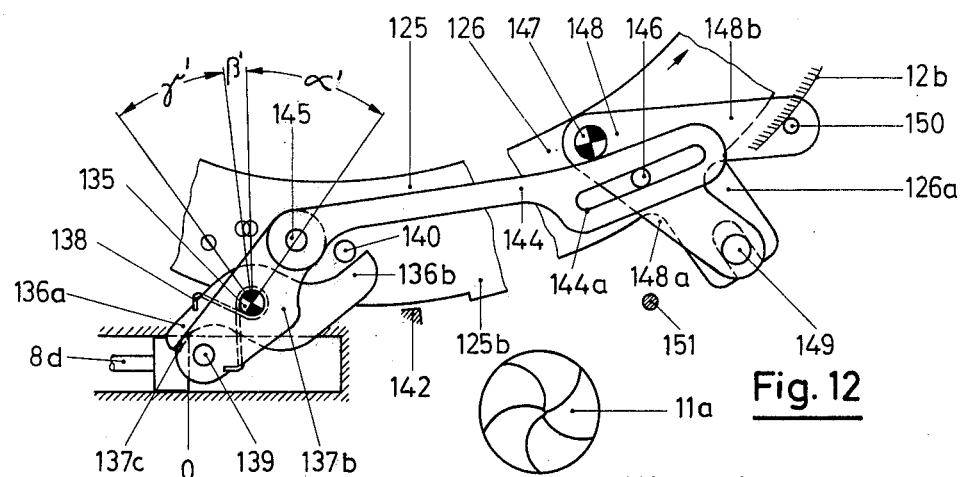
Figure 13:
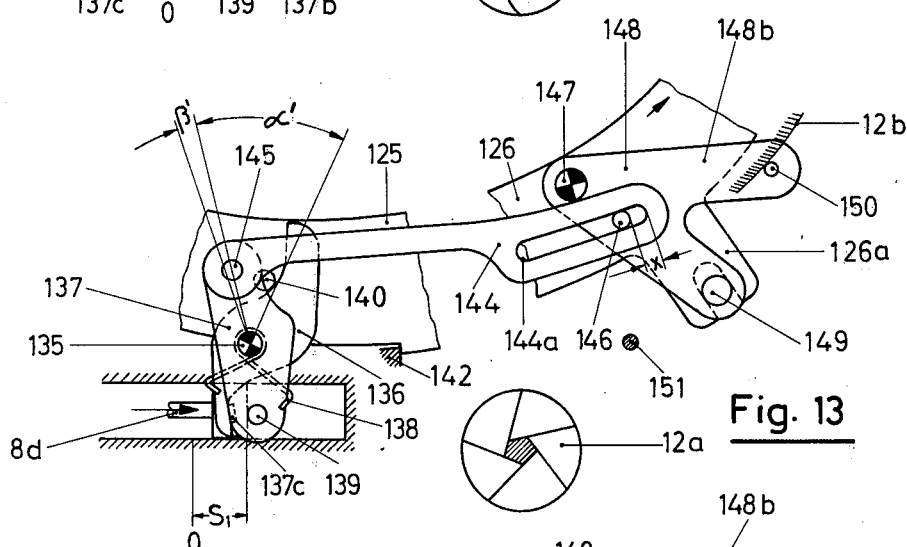
Figure 14:
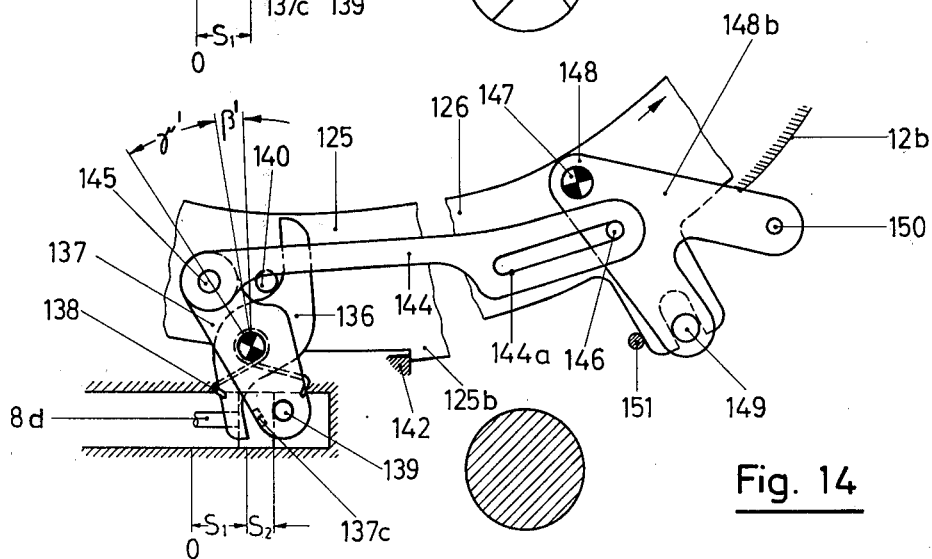

Other and further objects and advantages of the present invention will become apparent from the within specification and accompanying drawings, in which:

FIG. 1 is a schematic view which shows an embodiment of a cable releae arrangement or combination according to the present invention, which is suitable for connection to a professional camera shutter of general construction, to effect viewing of the ground glass focussing screen and shutter release, FIG. 2 is a schematic sectional view which shows, on a larger scale, the switching device of the cable release combination shown in FIG. 1, FIG. 3 is a schematic sectional view which shows a further embodiment of a cable release combination according to the present invention for use with a particular type of professional camera which comprises a so-called "automatic cable" which automatically closes the camera shutter when a film cassette is inserted into the rear lens carrier frame, FIG. 4 is a schematic sectional view which shows, on a larger scale, the switching device of the cable release combination shown in FIG. 3, FIG. 5 is a perspective view of the part of the interposed power transmitting lever which cooperates with the flexible power transmitting members of the cable release combination shown in FIGS. 3 and 4, FIG. 6 is a schematic diagrammatic view of the shutter segments and the diaphragm blades, which refers to the various phases of movement of the switching device shown in FIGS. 1 and 2, illustrating their positions relative to the respective switching positions, FIG. 7 is also a schematic diagrammatic view of the relative lifting position of the push rods, which belong to the two flexible power transmitting members, and of the associated relative position of the shutter segments and the diaphragm blades in the respective switching position adopted by the power transmitting lever of the switching device shown in FIGS. 3 to 5, FIG. 8 is a schematic sectional view which shows a further embodiment of a switching device according to the present invention set to position $P_3$ of the switching lever shown in FIG. 1, FIG. 9 is a schematic side view showing the relationship between components of the switch device shown in FIG. 8, FIG. 10 is a schematic view which shows, on an enlarged scale, the geometry or shape of one of a plurality of stop notches machined into the cam disc of the switching device shown in FIG. 8, FIG. 11 is a schematic view which shows a simplified embodiment of a device according to the present invention for actuating the shutter segments and the diaphragm blades, FIG. 12 is a schematic view which shows a further embodiment of a device of the type shown in FIG. 11, in the initial position, wherein the shutter segments adopt the closed position and the diaphragm blades adopt a set position, which cannot be recognized more fully herein as the diaphragm blades are behind the closed shutter segments as shown, but which corresponds to a preselected diaphragm value, FIG. 13 is a schematic view which shows the actuating device shown in FIG. 12 with the shutter segments in the fully open position and the diaphragm blades in a set position which corresponds to a preselected diaphragm value with the smallest aperture width; and FIG. 14 is a schematic view which shows the actuating device of FIG. 12 in the end position, in which both the shutter segments and the diaphragm blades are set to the fully open position.

According to a first main aspect of the present invention, a cable release arrangement or combination which is connectable to the shutter of a camera is provided, comprising two flexible power transmitting members. The two members are provided at one corresponding end thereof with an actuating handle, and at the other corresponding end thereof with a threaded connection. One of the power transmitting members is used to release the camera shutter and the other power transmitting member is used to actuate the diaphragm blades and/or the shutter segments for the purpose of viewing the field of the camera through the objective aperture of the shutter for the usual purposes prior to taking a photograph.

Specifically, the first said power transmitting member, i.e. for effecting the shutter release, is actuatable by direct finger pressure upon an axially displaceably mounted first push rod, whereas the second said power transmitting member, i.e. which acts upon the diaphragm blades and/or the shutter segments, is actuatable indirectly by way of a switching device which progressively displaces a second such push rod. In this regard, the end pieces of the two power transmitting members, which guide the push rods, are combined in one common housing which advantageously serves to accommodate the switching device and also fulfills the function of a handle for the cable release arrangement.

In this manner, a cable release arrangement or combination can be provided which is designed for the specific requirements of a photographic camera having manual diaphragm and segment actuation so as to achieve such intermediate viewing through the objective aperture of the shutter, and which makes it easier and clearer for the photograher to use the camera, since a separate actuating counterpart handle means is provided on the common housing for each of the two power transmitting members, the two actuating counterpart handle means clearly differing one from the other desirably in respect of shape and use.

To achieve a construction which is simple to operate yet which avoids components which are more susceptible to wear and failure, one preferred embodiment of the present invention contemplates that the switching device include a cam disc, which is manually actuatable by means of a switching lever as its counterpart handle means and which has a multi-stepped lifting cam, as well as a power transmitting lever, which cooperates with the lifting cam. Conveniently, the cam disc is mounted rotatably and acts upon the second push rod of the second power transmitting member, i.e. for actuating the diaphragm blades and/or the shutter segments, in a pressure-loading or pressure-relieving operative manner depending upon the direction of rotation of the cam disc.

One further advantage of this preferred arrangement is based on the fact that it is clearly apparent to the photographer, in which of the movement phases, provided by the progressive or multi-stepped graduation of the control cam, the diaphragm blades are actuated and in which of such movement phases the shutter segments are actuated.

If, as further contemplated herein, the power transmitting lever of the switching device is designed as a two-armed angle lever, whose one or first lever arm rests on the lifting cam of the cam disc and whose other or second lever arm rests on the second push rod of the second power transmitting member, i.e. which actuates the diaphragm blades and/or the shutter segments, then a feature is provided therein which is useful for attaining a switching device having a compact structure.

In order to enable the cable release arrangement or combination, will all its advantageous features, to be used with the usual type of lens carrier cameras having a rear lens carrier or the like, which is designed to accommodate a film cassette, and which is provided with a threaded connection for an automatic cassette cable by means of which, during insertion of a cassette into the lens carrier, the segments of the camera shutter are automatically displaceable from the fully open position to the closed position, provision is preferably additionally made according to the present invention for the automatic cable to be connected to the common housing which accommodates the switching device, so that an effective separate connection may be attained, via this switching device, with the second power transmitting member which serves to actuate diaphragm blades and/or shutter segments.

Furthermore, a spring is preferably provided which acts upon the two-armed power transmitting lever of the switching device, such that the spring is able to actuate, via one arm of the lever, the second power transmitting member, i.e. which acts upon the diaphragm blades and/or the shutter segments, thereby keeping the other lever arm in frictional abutment with the lifting cam of the cam disc. Advantageously, in this regard, the automatic cable cooperates with the second power transmitting lever in such a manner that, on the one hand, during insertion of a cassette into such lens carrier frame the cable rod counteracts the pressure of the actuating spring, or on the other hand, during removal of the cassette the cable rod withdraws under the pressure of such spring.

From this point of view of manufacturing technique, a significant advantage of this preferred arrangement is that for its attainment, with the exception of the cam disc, the same components may be used, such as, for example, the power transmitting lever, the housing for the counterpart handle means, etc., as are used in the first mentioned embodiment.

A further preferred feature of the present invention concerns the inclusion of stop notches on the peripheral edge of the cam disc which can be adjusted by means of a switching lever. Suitably, these notches are provided with a rigidly mounted and spring-loaded stop lever. The advantage which can be gained with this feature is that, besides securing the cam disc in the corresponding switching position which it may adopt, the photographer can sense when the cam disc has reached the particular switching position as definitively predetermined by the stop notch.

A simple indication of the momentary set position adopted by the switching device may be achieved by providing picture symbols which serve to characterize the corresponding switching position of the cam disc. These symbols are selected such that they are identical to the corresponding set position which the shutter segments or diaphragm blades adopt in the respective switching positions relative to the objective aperture of the shutter.

A further object and advantage of the present invention concerns the development of the cable release arrangement or combination, which is described more fully above, so that while retaining its fundamental structural design and precluding additional structural expenditure, it may still be used selectively both in professional cameras of the first mentioned type for manual remote control as well as in connection with a so-called "automatic cassette device" in lens carrier cameras which are provided with an automatic cassette cable normally connecting the cassette holder to the camera shutter.

Also according to a second main aspect of the present invention, a cable release arrangement or combination is provided in which a spring acts upon the cam disc of a switching device, this spring fulfilling the function of a power storage means and experiencing an increase in initial tension when the switching lever, serving to actuate this disc, is set to one or another of the picture symbols assigned to it, and in which a lock engages with the cam disc, this lock absorbing the restoring force of the spring in the corresponding set position and being detachable or releasable by means of an automatic cassette cable which is connectable to the cassette holder of a lens carrier camera.

This arrangement is advantageous in that the cassette may be inserted into the holder provided therefor in a lens carrier type camera, after the camera has been prepared to take a photograph, without the use of power, since the restoring force necessary for the automatic return of the segments of the camera shutter from the open to the closed position has already been applied during the actuation of the switching lever which serves to select the set position, such restoring force having been stored in the handle of the cable release arrangement combination which is flexibly connected to the camera. This prevents, with absolute certainty, any possible change of the setting of the camera once it has been set up to take a photograph.

A further preferred feature of the present invention contemplates that the lock be designed as a two-armed locking lever and that it cooperate at one end with differentially biassing stop notches machined on the edge of the cam disc, the side slope angles of these notches being differentially selected so as to be of different sizes or slope values relative to a radial line intersecting the respective notch at its lowermost or innermost point. Consequently, on the one hand, by way of the steeper sloe side of each notch, adequate security may be achieved with the locking of the cam disc and, on the other hand, by way of the shallower or less steep other side of each notch, a displacement of the lock may be insured with as little use of power as possible during the setting process of the cam disc.

One advantageous concept, which insures the positive operation of the cable release arrangement or combination over a long period of time, may be achieved according to the present invention, by providing a tension spring which serves as a power storage means for the switching device.

In addition, a further preferred feature of the present invention concerns the cooperation of the cable release arrangement or combination with an actuating device for the temporary opening and closing again of the shutter segments and/or diaphragm blades prior to taking a photograph, in the case of shutters whose diaphragm blades can be selectively adjusted or set to a specific aperture width or size by means of manual setting members.

In the case of the known camera shutters of the above type which are provided with an actuating device for ground glass focussig screen viewing, a radially extending arm, which serves to engage directly the push rod of a cable release, was hitherto provided on the shutter segment ring. In addition, stops were provided both on the shutter segment ring and on the diaphragm blade ring and these were operatively associated one with the other such that, during actuation of the cable release, the stop disposed on the shutter segment ring would meet and carry therewith the stop formed on the diaphragm blade ring sooner or later, depending upon the presetting of the operating diaphragm aperture, with the effect that the diaphragm blades and the shutter segments, which were already moved in the opening direction from the outset of the release actuation, would not participate in the movement of the push rod, i.e. would be moved jointly in the opening direction, until both systems would have approximately simultaneously reached the fully open position.

The disadvantage with this known arrangement, however, is that the opening movements of shutter segments and diaphragm blades are scarcely noticeable to the camera user and, in addition, they are not distinguished from one another in a readily recognizable manner. Hence, when setting the exposure, the camera user does not have any indication as to whether, during the momentary cable release actuation, the shutter segments participate in an opening movement on their own, or whether the diaphragm blades also participate therein together with these shutter segments.

A further disadvantage with such known arrangement is that, with partially opened shutter segments, it is possible to make a diaphragm correction with the objection of enlarging the diaphragm aperture, but an effective enlargement of the passage of light can only be achieved when the shutter segments are also subsequently brought to the same aperture width by the additional actuation of the cable release. A reduction in the partially opened diaphragm blades is also not readily possible with such known arrangement, since the counterpressure of the push rod, which acts directly upon the shutter segment ring, only permits a return of the diaphragm blade ring, which frictionally abuts this shutter segment ring, when a pressure relief or return of the cable release has been previously effected.

It is self-evident therefore that a lot of time must necessarily be spent setting the exposure or the diaphragm systems of a camera with reference to the ground glass focussing screen image in the above-described circumstances when using such known arrangement, and the photographer may also experience considerable difficulties.

A further object and advantage of the present invention is, therefore, to provide a shutter arrangement, which is designed to cooperate with the cable release arrangement or combination according to the present invention, so that both the shutter segments and diaphragm blades can be set quickly and easily to the correct aperture width by means of the cable release in progressive opening movements which are clearly defined from one another with reference to the ground glass focussing screen image.

In this regard, it may also be attained that, with shutter segments which are in the fully open position and with diaphragm blades which are only partially opened, the operating diaphragm aperture can be corrected either by widening or narrowing the same.

In this regard, according to an overall aspect of the present invention, a photograph shutter may be provided which has forwardly and backwardly movable shutter segments and fowardly and backwardly movable diaphragm blades, whose corresponding diaphragm aperture width is presettable by means of manual setting members, and which shutter also has an actuating device, which is actuatable by means of a cable release arrangement or combination which is connectable to the shutter housing, and which is provided so as to enable the camera user to view the ground glass focussing screen prior to taking a photograph by the temporary opening of the shutter segments and the diaphragm blades.

In this regard, the actuating device suitably has a setting mechanism which is associated with the shutter segments and the diaphragm blades, and which is actuatable by a push rod of the cable release. The setting mechanism is designed as a spring deflector and acts upon the shutter segment system or the diaphragm blade system in a differential manner with the pressure loading of the cable release such that, in a first movement phase, during which the diaphragm blades retain their aperture width corresponding to the accomplished preselection, the shutter segments are moved out of the closed position into the fully open position and, in a second movement phase, during which the shutter segments retain the fully open position, the diaphragm blades are also moved to such an extent that they have also reached the fully open diaphragm aperture position.

In this manner, with a shutter having a device for viewing the ground glass focussing screen, a substantial improvement in the ratios of movement can be obtained in that the camera user, on the one hand, can set the camera easily to intermediate viewing with depth of field judgment and also to full aperture so as to produce the brightest ground glass focussing screen image, together with the operating advantage of correcting the depth of field while maintaining the fully open position of the shutter segments. This, when viewed as a whole, not only considerably facilitates the preparatory work for taking a photograph, but also noticeably shortens this work from the point of view of time.

Preferably, the actuating device spring deflector comprises a first actuator member, which acts upon the driving member of the shutter segment system, and a second actuator member, which acts upon the driving member of the diaphragm blade system. These two actuator members are so relatively movably associated with one another, and are so resiliently brought into frictional connection with one another by a pretensioned spring that, during actuation of the cable release, the first actuator member initially moves the shutter segment driving member over a specific movement path, whose maximum limit of travel is defined by a stationary stop, and subsequently the second actuator member, which has, moreover, participated up to that point in the advancing movement of the cable release, drives the diaphragm blade ring driving member, by overcoming the spring force, from the set position thereof, corresponding to the preselected diaphragm value, as far as a corresponding stationary stop which likewise defines the maximum limit of travel or rotational movement of the diaphragm blade driving member.

One particularly advantageous embodiment of an actuating device, which appropriately takes into account the structural detail of an inter-lens shutter, or between the lens shutter, may be achieved according to a further preferred arrangement of the present invention, in that the first actuator member, which acts upon the driving member of the shutter segment system, is designed as a two-armed double lever rotatably mounted on a stationary axis and, by the action of a spring, is held in frictional abutment with a coaxially mounted double linkage lever which is actuable by means of the push rod of the cable release, and, between the coaxially mounted double lever and a rigidly mounted transmission lever, which acts upon the driving member of the diaphragm blade system, there is preferably provided a driving connection, e.g. in the form of a lost motion intermediate interconnecting linkage, which permits the two lever arrangements, associated with the shutter segment system and the diaphragm blade system, to move independently of one another.

In order to insure extensive freedom of choice regarding the design and arrangement of the actuating device in the interlens shutter and also to insure a trouble-free operation of this device, it is also contemplated that the lever arrangements, which are associated with the driving members of the shutter segment system and diaphragm blade system, preferably be brought into driving engagement, e.g. for attaining such lost motion intermediate interconnecting linkage, by way of a coupling rod, one end of which is connected in an articulated manner to the double lever, which is actuatable by means of the push rod of the cable release, and the other end of which, facing the driving member of the diaphragm blade system, is connected to the transmission lever acting on this member by way of a pin slot guide which permits a full opening and closing movement both of the shutter segments and of the diaphragm blades.

Referring to the drawing, and initially to FIG. 1, an inter lens shutter or shutter housing 1 is shown, which, both from the point of view of construction and also from the point of view of its function, is specifically designed for the purposes of a professional or studio camera with viewing by a ground glass focussing screen through the objective aperture of the shutter, and which is provided in a manner known per se with shutter segments 1a, which are rotationally movably mounted in the shutter housing, with diaphragm blades, which are not shown more fully as they are located behind the closed shutter segments as shown, and with a manually actuatable diaphragm setting member or adjustment device 2, mounted on the housing 1, for the manual preselection of the diaphragm aperture width or size.

As can be seen particularly from FIG. 1, the interlens shutter which is shown as a self-cocking shutter, known per se, has, in addition to a shutter release 3, two threaded connector means 4 and 5. The first connector means 4 is associated with the release mechanism of the shutter for releasing the system of shutter segments for taking a photograph, while the other or second connector means 5 is associated with an actuating device (cf. FIGS. 11 and 12 to 14), which is accommodated in the interior of the shutter housing, and by means of which the shutter segments and/or the diaphragm blades can be moved temporarily from their initial position into the fully open position to permit viewing on the ground glass focussing screen prior to taking a photograph.

The arrangement is designed so that, during actuation of this actuating device (S=shutter segment-actuated, B=diaphragm blade-actuated), in a first switching step a, as indicated schematically in FIG. 6, the shutter segments 1a are moved from the closed position into the fully open position, while the diaphragm blades 2a maintain the preselected or set operating diaphragm aperture width or size for the purpose of assessing the depth of field, and in a second switching step b, for the purpose of producing a bright or full light ground glass focussing screen image, the diaphragm blades 2a are moved to the full aperture width or size, as well.

The actuation of the actuating device for the manual opening and closing correspondingly of the shutter segments 1a, and of the diaphragm blades 2a, is effected in a similar manner to the actuation of the shutter release mechanism, i.e. correspondingly by means of the linear flexible power transmitting members or motion transmitting means 7 and 8, which are designed preferably like conventional push rod cable releases and are connectable to the threaded connector means 4 or 5, respectively, of the shutter housing 1 by means of threaded nipples or like connecting means 7a and 8a.

While the flexible power transmitting member 7, which is associated with the release mechanism of the shutter, is actuatable directly by means of a finger push rod or like counterpart handle means end portion of the linear push rod 7b, the other power transmitting member 8 is brought into effective engagement with a switching device which is accommodated in a common housing 9, design as a corresponding composite handle, and is actuatable indirectly by means of a switching lever 10 or like counterpart handle means, which is operated independently of the finger push rod 7b.

As shown in FIG. 2, both power transmitting members 7 and 8 are inserted into the housing 9 and are each supported against the housing 9 by means of a sleeve or end piece 7c or 8c respectively which serves simultaneously to guide the corresponding push rod of the power transmitting members.

As can also be seen from FIG. 2, the switching device as such comprises a cam disc 12 which is preferably rotatably mounted in the housing or cover 9 and is non-rotatably or fixedly connected to the switching lever 10 which is manually actuated to rotate the cam disc. On its periphery, the cam disc 12 has a progressive or multi stepped lifting cam which serves to actuate indirectly the switching device actuated linear push rod 8d and is composed of two cam sections 12a and 12b which are adjacent one another.

Relative to the axis of rotation 13 of the cam disc 12, each of these two cam sections 12a and 12b is provided with a radial upward or progressive slope. In the case of the cam section 12a, this slope commences with the shortest radial distance from the axis of rotation and, in the case of the cam section 12b, this slope terminates with the greatest radial distance from the axis of rotation.

Cooperating with the cam disc 12 is a two-armed power transmitting lever or other cam follower means 15. The two-armed lever 15 is rotatably mounted on a pin 14, fixed to the housing 9, and is preferably designed as a toggle lever, one of its lever arms 15a resting on the rod 8d, which is under the axial spring pressure of its return spring (not shown), e.g. operatively arranged within the sleeve or end piece 8c, and its other lever arm 15b being held in frictional abutment with the cam disc 12 under the action of such return spring of the rod 8d. A pin 16 is conveniently disposed on the free end of the lever arm 15b for achieving such frictional abutment with the cam disc 12 under such return spring.

Proceeding from the initial switching position shown in FIG. 2, when the cam disc 12 is rotated in a clockwise direction, the lever 15 is acted upon via pin 16 in follower engagement with the cam sections 12a and 12b, which results in a rotation, be it only a gradual rotation, of the lever 15 through two different phases of movement, which are interrupted by a brief stoppage, in a counterclockwise direction about the pin 14. The pressure or load produced thereby is transmitted by the lever arm 15a to the rod 8d of the power transmitting member 8, so that the rod 8d itself, under the pressure loading, experiences two distinct movement phases.

This switching movement in turn is imparted by way of the rod 8d to the actuating device, disposed in the shutter 1, for the temporary opening and closing of the shutter segments and diaphragm blades. This actuating device, in accordance with the function for which it is intended, must be designed and arranged so that, as indicated in the diagrammatic view in FIG. 6, it is capable of initially moving the system of shutter segments 1a into the fully open position from the closed position over the movement phase a (which corresponds to the cam section 12a) and of subsequently moving the diaphragm blades 2a from the preselected operating diaphragm position over the movement phase b (which corresponds to the cam section 12b), i.e. in progressive or successive manner.

After the first movement phase a, by which the shutter segments 1a have moved to fully open position, therefore, the photographer has at his or her disposal an image on the ground glass focussing screen which allows assessment of the depth of field since the diaphragm blades at this point remain at the predetermined aperture size position, and, after the second phase movement b, has an image on the ground glass focussing screen which is much brighter, since the diaphragm blades 2a have also moved to fully open position and have thus fully opened the objective passage or aperture of the shutter.

In order, on the one hand, to retain the cam disc 12, which is continuously switchable by means of the switching lever 10, in each available switching position, and, on the other hand, to allow the operator to recognize by feel both the commencement and the end of the amplitudes of travel of the respective cam sections 12a and 12b, a plurality of stop notches 12c is provided on the remote edge of the cam disc 12. These notches 12c are located at selective positions which correspond with the commencement and the end of each respective cam section 12a or 12b and cooperate with a stop lever 21 mounted on the housing 9 and biased by a compression spring 20.

In addition, to limit the available angle of rotation or reciprocal displacement region of the cam disc 12, rigid stops 22 and 23 are provided on the housing 9 which are disposed in the movement path of the respective stop edges 12d and 12e, which are suitably radially formed on the cam disc 12. Each respective switching position, which lies within the available angle of rotation or displacement region of the cam disc 12, may be readily identified to the user of the cable release arrangement by numbers, letters, or the like.

However, to identify each switching position of the cam disc 12, a plurality of picture symbols $P_1$, $P_2$ and $P_3$ is preferably used, as can be seen from FIG. 1, these symbols being identical to the set position which the shutter segments 1a or the diaphragm blades 2a adopt, as the case may be, in the respective switching position relative to the objective aperture (cf. FIG. 6). Thus, the user of the cable release arrangement is given an indication which excludes, with absolute certainty, erroneous conclusions as to the condition of the shutter segments and of the diaphragm blades.

Thus, in position $P_1$, the shutter segments are in open position and the diaphragm blades are in fully open aperture position (bright viewing), in position $P_2$ the shutter segments are in open position and the diaphragm blades are in preselected aperture size position (depth of field viewing), and in position $P_3$ the shutter segments are in closed position and the diaphragm blades are in preselected aperture size position (for taking a photograph).

The cable release arrangement, such as is shown in FIGS. 3 to 5, is identical in principle to the previously described embodiment of FIGS. 1 to 2, both from the point of view of structure and also from the point of view of mode of operation, and therefore like reference numerals have been used in the drawings for like components common to both embodiments, with the sole difference being that, in this second embodiment, the reference numerals have also additionally been provided with a prime designation. If structural differences can be seen, the only reason for this is that the second embodiment is specifically designed for the purposes of a lens carrier camera of the type whose rear lens carrier or carrier frame 25, as can be seen from the drawing (FIG. 3), is designed to accommodate a film cassette 26 and is provided with a threaded bore 25a for the connection of an automatic cassette cable 27.

What is to be understood by the term "automatic cable" or "automatic cassette cable" is a power transmitting member or motion transmitting means which is similar to the usual cable release and by means of which the segments 1a' of the camera shutter 1' are necessarily, e.g. automatically, reversible from the fully open position to the closed position when a cassette 26 is inserted into the rear lens carrier. This occurs because, upon the insertion of the film cassette 26, the rod 27a of the automatic cable 27 is depressed and is therefore axially displaced.

The rod 27a, for its part, transmits this movement to the lever arm 15a' of the angle lever 15', this lever 15' thereby being pivoted about the axis 14' in a clockwise direction against the action of an actuating spring 28, which engages with a pin on the arm 15a' and fulfils the function of an energy storer. This clockwise rotational movement is followed by the spring-loaded rod 8d' of the power transmitting member 8', e.g. by way of a return spring (not shown) operatively arranged within the sleeve or end piece 8c', and the rod 8d' acts upon a laterally bentover lug 15c of the lever arm 15a' (FIG. 5). The power transmitting member 8' cooperates with the actuating device for the temporary opening and closing of the shutter segments and diaphragm blades.

During this temporary moving operation, the segments of the shutter change over from the fully open position to the closed position, whereby the camera is primed and ready for taking a photograph, and the lever arm 15b' of the angle lever 15' adopts the end position indicated in FIG. 4 by a dash dot line. The remarkable feature about this end position is that, after insertion of the film cassette 26 into the lens carrier frame 25, the lever 15b' has moved under the action of the cassette rod 27a so far away from the cam sections 12a' and 12b' that these cam sections cannot exert any further influence upon the set position of the angle lever 15' or in turn upon the now closed condition of the shutter segments and the predetermined aperture size condition of the diaphragm blades.

If the cassette 26 is thereafter removed from the lens carrier frame 25, the rod 27a of the automatic cable 27 is thereby relieved of pressure. This in turn results in the lever 15' following the movement of the rod 27a, by the action of the restoring force of the actuating spring 28, which is under high initial tension, whereby pressure is once more exerted upon the rod 8d' of the power transmitting member 8' via the laterally bent over lug 15c of the lever arm 15a'.

In accordance with FIG. 11, or correspondingly FIGS. 12–14, this pressure loading is, in turn, transmitted to the actuating device, disposed on the shutter, for the temporary opening and closing of the segments, with the effect that, the segments 1a return to the fully open position and, the stop pin 16' of the lever arm 15b' returns into engagement with the corresponding cam section 12a' or 12b' of the cam disc 12', depending upon which selective set position the cam disc 12' adopts.

In a different manner from the case of the embodiment shown in FIGS. 1 and 2, the cam disc 12' in the embodiment of FIGS. 3 to 5 has cams for actuating the rod, i.e. the cam sections 12a' and 12b' which are not formed on the edge of the disc 12', but instead are formed in a slotlike recess in the disc 12', in such a manner that, with the abutment of the lever arm 15b' against the cam section 12a' as shown in FIG. 4, both the segments 1a' and the diaphragm blades 2a' adopt the fully open position (cf. FIG. 7). This set position is clearly recognizable to the camera user from the position of the switching lever 10' which, as FIG. 3 shows, indicates the appropriate symbol $P_1'$.

If, however, the switching lever 10' is changed over to indicate symbol $P_2'$, which corresponds to the position the diaphragm blades 2a' adopt for a preselected aperture, i.e. while the shutter segments still remain in open position (cf. FIG. 7), the cam disc 12' experiences a clockwise rotation about the axis 13', whereby the pin 16' leaves the cam section 12a', with the simultaneous displacement of the lever 15', and changes over to the cam section 12b'.

While the rod 27a of cable 27 remains in rest or idle position, as can be seen particularly from FIG. 7, i.e. when the film cassette 26 has been removed from the lens carrier frame 25, the spring-loaded rod 8d' follows the lug 15c along the movement phase b in switching from the bright ground glass focussing screen image position $P_1'$. By means of this movement, the diaphragm blades are moved from the fully open aperture position and are set to the preselected aperture width according to position P₂' in FIG. 7 by way of the actuating device, disposed on the shutter, for opening and closing the shutter segments and diaphragm blades. Thus, after viewing the bright ground glass focussing screen image (position P₁'), the camera user now has at his or her disposal another ground glass focussing screen image (position P₂') which enables the depth of field to be judged with the preselected diaphragm setting or to correct the presetting of the diaphragm by further adjustment.

If the user has found the optimum value for the diaphragm setting in such a further operation, insofar as it might have proved necessary to carry out such an operation, then in order to prepare the camera for taking a photograph, it is only necessary to insert the film cassette 26 into the holder of the lens carrier frame 25, whereby the rod 27a of the automatic cable 27 becomes pressure loaded and is axially displaced. The displacement of the push rod 27a causes the lever 15' to rotate as far as the end position indicated in FIG. 4 by dash-dot lines. The rotational movement of the lever 15' and the lug 15c is followed by the spring-loaded rod 8d' along the movement phase a, and this results in the shutter segments 1a' being moved from the fully open position to the closed position, while the diaphragm blades 2a' retain the preset aperture width, as also indicated in FIG. 7 according to the cassette position K. After this operating process, the camera is ready for shutter release by means of axial finger pressure upon the finger push rod or counterpart handle means end portion of the push rod 7b'.

If, after a photograph has been taken, the film cassette 26 is removed from the holder of the lens carrier frame 25, the rod 27 returns to the end position or rest position shown in FIG. 3 under the pressure of the actuating spring 28 which acts upon the lever 15', the end position being reached as soon as the pin 16' has frictionally abutted against the cam section 12b' according to the presetting of the cam disc 12'. With the return movement of the angle lever 15', the segments 1a' are returned again to the fully open position from the closed position because of the spring pressure upon the rod 8d'. However, the diaphragm blades 2a' maintain the preset aperture width until such time as the switching lever 10' has been rotated in a counterclockwise direction about the axis 13' to the alternative picture symbol P₁', and therewith the cam disc 12' so that the abutment pin 16' frictionally abuts against the cam section 12a', as shown in FIG. 4.

In FIGS. 8 to 10, a cable release arrangement combination is shown which, in principle, corresponds to the above-described embodiment shown in FIGS. 1 and 2, both from the point of view of structure and also from the point of view of mode of operation, but it has been further developed by a slight modification, so that it can be used with standard cameras with the advantages of an automatic cassette device. The arrangement is also designed so that, initially, the shutter segments 1a are moved in a first progressive switching step and the diaphragm blades are removed in a further progressive switching step, whereby the diaphragm blades initially maintain the preselected operating aperture, but then, as before, the diaphragm blades are moved to the fully open aperture width after the shutter segments have moved to open position.

If, upon rotation of the switching lever 10 in the clockwise direction about the axis 13, the cam disc 12 is rotated with the switching lever 10, as shown in FIG. 1, i.e. changed over from position P₃ to P₂ or P₁ respectively, a tension spring 60 (FIGS. 8 and 9), which, at one end, engages with the cam disc 12 and, at the other end, is held by a rigid anchoring means, is put under high initial tension. In this case, the tension spring 60, which fulfils the function of a power storage means, loops round an abutment ring 61 which is mounted laterally on the disc.

The cam disc 12 is held against the restoring force of the tension spring 60 in the respective set position P₂ or P₁ by means of a plurality of stop notches 12c, machined into the edge of the cam disc 12, each of which cooperates with a lock means which is preferably a two-armed lever 63 rotatably mounted on a stationary pin 62 on the housing 9. The locking lever 63 has a cylindrical pin 64 on one of the lever arms 63a which is held in releasable engagement with the respective stop notch 12c for each respective set position P₃, P₂ or P₁, by means of the spring 20 which acts upon the lever arm 63a.

In order to maintain the resistance of the locking lever 63, with frictionally engages the cam disc 12 with the pin 64, at a feasible switch facilitating level during the continuous switching movement of the cam disc 12, while insuring that the cam disc 12 positively maintains, i.e. against the return force or restoring force of the tension spring 60, the adopted relative position fixed by the lock, the biassing angle α, which is subtended between the flank or slope side of the stop notch 12c effective during the continuous forward progressive switching movement of the cam disc 12 and a radial line passing through the apex of the stop notch 12c, is selected so as to be greater than the biassing angle β, which is subtended between such radial line and the flank or slope side of the stop notch 12c effective during the return progressive movement of the cam disc 12, as shown in FIG. 10.

Thus, the forward switching direction side of the notch which engages the cylindrical locking pin 64 is shallower or less steep in slope than that of the return switching direction side of the notch which engages such locking pin 64.

As shown in FIG. 8, the locking lever 63 also comprises a lever arm 63b, which extends across the housing 9 and whose end protrudes into the region of an automatic cassette cable 65 which is connectable to the housing 9. The other or remote end of the automatic cable 65 is connected to the cassette holder 66 (not shown) of a camera in similar manner to cassette cable 27 at carrier frame 25 (FIG. 3). In this case, the relationship between locking lever 63 and automatic cable 65 in the housing 9 is arranged so that, during insertion of a cassette 26 into the cassette holder 66 on the camera, pressure is directly exerted upon the rod 65a of the automatic cable 65.

The locking lever 63 is displaced by the relative displacement of the rod 65a of the automatic cable 65, i.e. it is pivoted or rotated about the stationary pin 62 in a counterclockwise direction, and consequently the pin 64 is released or removed from the stop notch 12c, in which it had hitherto been engaged, i.e. operatively at the steeper slope return switching direction side of the particular notch. If this occurs, the cam disc 12 returns to its initial position, determined by a stop pin 12, due to the action of the spring 60, engaging with the cam disc 12. Simultaneously the power transmitting lever 15 is released whereby, synchronously therewith, the shutter segments change over from the fully open position to the closed position in the camera shutter. At the end of these movements the camera is primed for taking a photograph and the shutter may be released by actuating the finger push rod 7b.

In order to be able to transmit effectively and precisely the movement of rod 8d of the cable release 8 to the shutter segments and the diaphragm blades in two progressive or successive reciprocal movement phases which are to be clearly distinguished one from the other, an actuating device of the above discussed type is provided which acts upon the driving members of the shutter segments and the diaphragm blades.

According to a particularly simple embodiment as shown in FIG. 11, the actuating device may be formed from a deflector slide 127, which is disposed in the shutter housing 1 tangentially to the segment driving ring 125 or correspondingly to the disphragm blade driving ring 126, and which is guided in a linearly displaceable manner. This slide 127 is provided with a driving arm 127a and is continuously switchable through two movement phases a and b by means of the push rod 8d of the cable release 8.

For this purpose, a deflector part 129, which is provided with an angled arm 129b, is disposed on the slide 127 by means of a pin slot guide 130 and 129a. A spring 131, which is secured at one end to the slide 127 and which is under initial tension, engages with the deflector part 129 in such a manner that a tensile force of constant magnitude, directed in the pressing direction (see the arrow in FIG. 11) of the rod 8d, is exerted upon the deflector part 129 and consequently the deflector part 129 is held in frictional abutment with the two pins 130, thereby providing a composite spring deflector 127, 129, 131.

As can be seen also from FIG. 11, a pin 125a, disposed on the segment driving ring 125, cooperates with the driving arm 129b, and a pin 126a, disposed on the diaphragm blade driving ring 126, cooperates with the driving arm 127a. The arrangement shown in FIG. 11 is designed so that, in the event of a movement of the slide 127 to the right, the driving arm 129b first abuts the pin 125a and consequently the segment ring 125 participates in the initial displacement movement. The rotational movement of the segment ring 125 is terminated at the moment when the stop edge 125b, formed thereon, abuts the stationary stop 132, whereby the ring 125 and the driving arm 129b are blocked after the movement phase a, the segments 1a having reached the fully open position at the end of this phase.

During the course of the advance movement over the movement phase a, the driving arm 127a of the slide 127 has moved to such an extent that it comes to abut against the pin 126a. If, however, the advance movement is continued progressively over the movement phase b, also indicated in FIG. 11, the ring 126 now participates in the further slide movement with the simultaneous increase in the tension of the spring 131. This results in the diaphragm blades now being moved from the set position or predetermined aperture size position into the fully open aperture position.

The lengths of the progressive or successive movement phases a and b, which are to be covered by the spring deflector 127, 129, 131, and the angle of inclination of the cam sections 12a and 12b of the cam disc 12 of the cable release arrangement or combination, are advantageously adapted such that, from the functional point of view, the cam section 12a of the movement phase a and the cam section 12b of the movement phase be are respectively concordantly associated one with the other.

According to the alternative embodiment shown in FIGS. 12 to 14, the spring deflector of the setting mechanism for the shutter segments and diaphragm blades may also be formed from two separate two-armed deflector levers 136 and 137 which are individually rotatably mounted together on a stationary pin 135 in the shutter housing 1. One of these two deflector levers, namely the lever 137, is provided, on one of its two arms 137a, 137b, with a laterally bent lug 137c, against which the lever arm 136a of the lever 136 frictionally abuts under the influence of a pretensioned spring 138.

The pretensioning of the spring 138 is selected so that, when pressure or load is exerted by the push rod 8d on the pressure receiving pin 139, which is fixed on the lever 137, to rotate the lever 137, the lever 136 will rotate therewith and will still follow the lever 137 after the lever arm 136b has reached a pin 140 fixed on the shutter segment driving ring 125 and has in turn displaced this segment ring 125 through an angle of rotation amplitude or region α'. In this case, in this initial movement phase the segments 1a are moved from the closed position, shown in FIG. 12, into the fully open position which they reach shortly before a stop edge 125b, formed on the shutter segment driving ring 125, abuts a rigidly disposed stop 142 in the shutter housing 1. At this point, lever 136 is prevented from further rotation by the action of the stop 142 on the shutter segment ring 125.

A coupling rod 144, which is connected at one end in an articulated manner to the lever arm 137b by means of a floating pin 145, also participates in this initial movement, during which the push rod 8d, which is actuatable by means of the switching lever 10, traverses the movement phase $S_1$ and the spring deflector 136 to 138 passes through the angle of rotation amplitude or region α'. At the other end, the coupling rod 144 is brought into driving engagement with a V-shaped transmission lever 148, rotatably mounted on a stationary pin 147 in the shutter housing 1, by means of a longitudinal slot or lost motion adjustment slot 144a in which a slot pin 146, fixed on the transmission lever 148, engages.

As can also be seen from FIGS. 12 to 14, the transmission lever 148, to produce an effective connection with the diaphragm blade driving ring 126 which is provided with a bifurcated or form containing radial arm 126a, has a lever arm 148a provided with a drive pin 149, which engages in the fork of the ring arm 126a. The other lever arm 148b of the V-shaped transmission mission lever 148 cooperates with a control cam 2b of the manually actuatable diaphragm setting member 2, which is generally indicated in FIG. 1.

For this purpose, guide pin or cam follower pin 150 is disposed on the outer end of the lever arm 148b, and such guide pin 150 is held in frictional abutment with the control cam 2b by the influence of the restoring force, e.g. of a return spring (not shown), which acts upon the diaphragm blade ring 126 in a direction to the right, i.e. as is indicated by an arrow (FIGS. 12-14). Depending upon the setting of the diaphragm setting member 2, or correspondingly of the control cam 2b associated therewith, the diaphragm blade ring 126 always adopts a specific relative rotational position corresponding to this set position.

The angle of rotation of the diaphragm blade ring 126 is defined by a stationary stop 151 in the shutter housing 1 which may be disposed in the movement path of the raidal arm 126a.

As already stated above, the actuation of the push rod 8d, which is achieved by changing over the switching lever 10 from the set position P₃, shown in FIG. 1, i.e. shutter segments in closed position and diaphragm blades in preselected size aperture position, to the set position P₂, i.e. shutter segments in open position and diaphragm blades in preselected size aperture position, results in the push rod being displaced through the movement phase S₁ (FIG. 13). In this case, the spring deflector 136 to 138 passes from the position shown in FIG. 12 through the angle of rotation amplitude or region α' to the position shown in FIG. 13, simultaneously dirving the segment ring 125. Accordingly, the segments 1a have reached the fully open position at the end of this angle of rotation α', and the stop edge 125b of the ring 125 comes into abutment with the stationary stop 142, as can be seen from FIG. 13.

If, proceeding from this intermediate progressive position in which the diaphragm blades 2a are still at the preset aperture width, the switching lever 10 is changed over from the switching position P₂ to the switching position P₁, the coupling rod 144 drives the V-shaped transmission lever 148 along a longer or shorter idle path x, (FIG. 13) during which the lever 137 passes through an angle of rotation amplitude or region β', and te diaphragm blade ring 126 now participates in the rotational movement of the spring deflector 136 to 138, which is steadily opened against the force of the spring 138, i.e. lever 137 continues to rotate while lever 136 is prevented from further rotation by the action of stop 142 on the segment ring 125.

The idle path x or correspondingly the angle of rotation region β' of the spring deflector 136 to 138 of course is always dependent upon the presetting condition of the diaphragm. If, as shown in FIG. 13, the diaphragm is set to the smallest presettable aperture width, the idle path x has a minimum length. On the other hand, if the diaphragm is set to a large aperture width, the idle path is correspondingly longer.

However, in order to obtain respective movements of the shutter segments and diaphragm blades which are clearly distinguished one from the other, it must be insured that the opening movement of the diaphragm blades is not already set or begun before the shutter segments have reached the open position. Consequently, in accordance with a particular feature of the present invention, the longitudinal slot 144a in the coupling rod 144 is designed as a selective lost motion adjustment slot so that a short idle path x still remains even when the diaphragm setting member 2 has been set to the smallest diaphragm aperture width.

If the lever 137 of the spring deflector 136 and 138 has passed through the angle of rotation β', during the change over movement of the switching lever 10, and the coupling rod 144 has covered the idle path x, the pin 146 is grasped by the slot end 144a, which lies at the rear in the moving direction of the coupling pin 144, i.e. to the left, which results in the lever 137 now driving the transmission lever 148 and the diaphragm blade ring 126 therewith progressively over the remaining angle of rotation amplitude or region γ'. In this case, the diaphragm blades 2a finally reach the fully open position, shown in FIG. 14, when the push rod 8d has covered the second movement phase S₂. During this further movement phase, the two angles of rotation γ' and β' are always in an inversely proportional relationship relative to one another since they are complemental to each other.

Thus, as the magnitude of the idle path x decreases, the angle β' correspondingly decreases and the angle γ' correspondingly increases in direct ratio thereto, and as the magnitude of the idle path x increases the angle β' correspondingly increases and the angle γ' correspondingly decreases in direct ratio thereto. The cumulative additive angle through which floating pin 145 reciprocates is therefore constant and includes the constant angle α' and the constant combined angle β' and γ', with the values of the individual angles β' and γ' changing inversely to one another in dependence upon the magnitude or linear value of the idle path x as selected by the diaphragm setting member 2.

If, after reaching the end position of the actuating device, shown in FIG. 14, the switching lever 10 of the switching device as shown in FIGS. 1 and 2 is reset reciprocally from the set position P₁ to the set position P₂ and, in association therewith, the change oveer to the next following switching position P₃ is reciprocally effected, the above-described moving procedures are completed in reverse progressive or successive order. Consequently, in a first switching step, the diaphragm blades 2a are initially reset to the aperture width shown in FIG. 13, whereupon, in a further switching step, the shutter segments 1a follow and adopt again the closed position, shown in FIG. 12, at the end of the resetting movement.

As may be seen from the foregoing, therefore, in accordance with a first main aspect of the present invention, a cable release arrangement (cf. FIGS. 1 to 7) is provided, which is connectable to the shutter or shutter housing of a camera having an objective aperture or lens aperture which is provided with shutter segments selectively releasable to take a photograph and selectively actuatable between a closed shutter position and an open shutter position and with diaphragm blades selectively adjustable to a predetermined width or size aperture and selectively actuatable between a preselected width or size aperture position and a fully open aperture position.

Such cable release arrangement comprises a housing forming a common manually manipulatable actuating handle, a switching device or switching means operatively arranged on the housing, and first and second linear flexible power transmitting members or transmitting means, each member having an adjacent end provided with an end piece disposed on the housing and a remote end provided with a shutter connection for operatively connecting the corresponding member to the shutter or shutter housing of such a camera.

The first member is adapted for effecting release of the shutter segments to take a photograph, and is provided with a first axially displaceably mounted push rod which is guided in the end piece of the first member and arranged on the housing for finger pressure direct actuation to displace the first push rod for effecting in turn such release of the shutter segments. On the other hand, the second member is adapted for correspondingly actuating the shutter segments and the diaphragm blades to view the field of the camera through the objective aperture of the shutter or shutter housing, and is provided with a second axially displaceably mounted push rod which is guided in the end piece of the second member and operatively connected with the switching device for indirect actuation progressively by the switching device to displace progressively the second push rod for correspondingly actuating in turn the shutter segments and the diaphragm blades.

More specifically, the switching device may include a rotatably mounted cam disc having a progressive multi-stepped lifting cam, a switching lever arranged for manually rotating the cam disc reciprocally among a progressive series of selective switching positions, e.g. from an initial switching position to a final or ultimate switching position, and a power transmitting lever operatively interconnecting the lifting cam and the second push rod and arranged for displacement by the lifting cam upon rotation of the cam disc for corresponding reciprocal pressure loading and pressure relieving operative actuation of the shutter segments and the diaphragm blades in dependence upon the direction of rotation of the cam disc.

Preferably, the power transmitting lever is in the form of a pivotal two armed angle lever having a cam lever follower arm disposed in operative follower engagement with the lifting cam and a rod lever thrust arm disposed in operative thrust engagement with the second push rod.

With regard to a particular feature of this first main aspect of the present invention, an automatic cassette cable or cable means (cf. FIGS. 3 to 5 and 7) is included, having an adjacent end disposed on the cable release arrangement housing and a remote end operatively connectable to a film cassette accommodating lens carrier or carrier frame, e.g. a rear lens carrier frame, of such a camera, and provided with an axially displaceably mounted cassette push rod operatively connected at the adjacent end of the cable with the switching device and arranged for actuating the switching device for indirectly actuating the second push rod and arranged at the remote end of the cable for automatic actuation by such a film cassette during corresponding insertion of such film cassette in such lens carrier for corresponding actuation in turn of the switching device and second push rod.

More specifically, an actuating spring is operatively connected with the power transmitting lever and arranged for urging the rod lever arm against the second push rod under the spring force of the actuating spring and also for urging the cam lever arm into frictional contact with the lifting cam under such spring force. In turn, the cassette push rod is advantageously arranged for coaction with the power transmitting lever under such spring force such that upon insertion of a film cassette into the lens carrier the cassette push rod is actuated thereby to counteract such spring force and such that upon removal of such film cassette from the lens carrier the cassette push rod is actuated by the power transmitting lever under such spring force.

Preferably, the cam disc is provided with a series of stop notches selectively positioned thereon remote from the lifting cam, and a rigidly mounted and spring loaded stop lever is disposed on the housing for operative releasable engagement with a particular stop notch to maintain the cam disc at a selective switching position.

More particularly, the switching lever is advantageously arranged for movement along a visible switching path on the housing among a progressive series of selective switching positions corresponding to those of the cam disc, and a corresponding picture symbol is disposed adjacent the switching path at each such switching position which indicates the concordant position of the shutter segments and of the diaphragm blades at the objective aperture of the shutter of the camera corresponding to such switching position.

Stated another way, in accordance with such first main aspect of the present invention, the cable release arrangement (cf. FIGS. 1 to 7) comprises a housing forming a common actuating handle, a switching device or switching means operatively arranged on the housing, first linear motion transmitting means having an adjacent end disposed on the housing and a remote end operatively connectable to the shutter of such a camera, and provided with a finger operated linearly displaceable first actuator having an adjacent end operatively arranged on the housing for finger displacement thereof and a remote end operatively arranged for effecting release of the shutter segments to take a photograph upon such finger displacement, and second linear motion transmitting means having an adjacent end disposed on the housing and a remote end operatively connectable to the shutter, and provided with a switching device operated linearly displaceable second actuator having an adjacent end operatively connected with the switching device for progressive displacement thereof by the switching device and a remote end operatively arranged for correspondingly progressively actuating in turn the shutter segments and the diaphragm blades to view the field of the camera through the objective aperture of the shutter upon such progressive displacement.

More specifically, the switching device includes a reciprocally movable cam means having a progressive multistepped cam portion and which is movable among a progressive series of the selective switching positions, and cam follower means operatively interconnecting the cam portion and the second actuator and arranged for corresponding reciprocal pressure loading and pressure relieving operative actuation of the shutter segments and the diaphragm blades in dependence upon the direction of reciprocal movement of the cam means.

With regard to the automatic cassette cable feature which may be included, the cassette cable correspondingly has an adjacent end disposed on the cable release arrangement housing and remote end operatively connectable to a film cassette accommodating lens carrier of such a camera, and is provided with a linearly displaceable cassette push rod operatively connected at the adjacent end of the cable with the switching device and arranged for actuating the switching device for indirectly actuating the second actuator and arranged at the remote end of the cable for automatic actuation by such a film cassette during corresponding insertion of the film cassette in such lens carrier for corresponding actuation in turn of the switching device and second actuator.

More specifically, an actuating spring is operatively connected with the cam follower means and arranged for urging the cam follower means against the second actuator under the spring force of the actuating spring and also for urging the cam follower means into frictional contact with the cam portion. In turn, the cassette push rod is arranged for coaction with the cam follower means under such spring force, such that upon insertion of a film cassette into the lens carrier the cassette push rod is actuated thereby to counteract such spring force and such that upon removal of such film cassette from the lens carrier the cassette push rod is actuated by the cam follower means under such spring force.

Moreover, in accordance with a second main aspect of the present invention, a cable release arrangement (cf. FIGS. 8 to 10) is provided, which is connectable to the shutter or shutter housing of a camera, e.g. having an objective aperture or lens aperture, which is provided with shutter segments, e.g. selectively releasable to take a photograph, which shutter segments are selectively actuatable between a closed shutter position and an open shutter position, and which is provided with diaphragm blades, e.g. selectively adjustable to a predetermined width or size aperture, which diaphragm blades are selectively actuatable between a preselected width or size aperture position and a fully open aperture position.

Such cable release arrangement comprises a switching device including a rotatably mounted cam disc having a cam portion operatively connectable with the shutter of such camera and adapted for correspondingly actuating the shutter segments and the diaphragm blades, and a switching lever arranged for manually rotating the cam disc reciprocally among a progressive series of selective switching positions, e.g. from an initial switching position to a final or ultimate switching position; a power storage spring, e.g. preferably in the form of a tension spring, having an initial tension condition and capable of undergoing a pressure load which increases its tension and of returning to its initial tension condition under a self-restoring force upon removal of such load and operatively connected with the cam disc for undergoing such load upon rotating the cam disc by the switching level from such an initial switching position to a progressive switching position; a lock arranged for operatively releasably engaging the cam disc at each switching position for maintaining the cam disc at such position against the force of the spring; and an automatic cassette cable.

Such automatic cassette cable has an adjacent end operatively connected with the lock and a remote end operatively connectable to a film cassette accommodating lens carrier of such a camera, and is advantageously arranged for automatic actuation for releasing the lock upon insertion of a film cassette into the lens carrier, whereby to permit the spring to rotate the cam disc in a direction back to its initial switching position.

More specifically, the cam disc is provided with a series of biassing stop notches selectively positioned thereon at progressive positions corresponding to the switching positions, and the lock is in the form of a pivotal lever having a releasing lever portion operatively connected with the automatic cassette cable for releasing the lock and a locking lever portion cooperating with the stop notches and arranged for operative releasable locking engagement with each respective stop notch to maintain the cam disc at a selective switching position corresponding to a particular stop notch, each stop notch having opposed biassing slope sides extending from the innermost point of the notch to the adjacent periphery of the cam disc and which define corresponding biassing angles of selectively different values relative to a common radial line extending from the corresponding axis of rotation of the cam disc through the innermost point.

In this way, the steeper slope side corresponding to the smaller of the two angles may be advantageously disposed relatively adjacent the initial switching position of the cam disc for resisting displacement of the lock from the particular notch under the force of the power storage spring, and correspondingly the opposing shallower or less steep slope side corresponding to the larger of the two angles may be advantageously disposed relatively remote from such initial switching position of the cam disc for facilitating displacement of the lock from such notch in moving the cam disc in a direction away from the initial switching position thereof and against the force of the power storage spring.

Here also, stated another way, in accordance with such second main aspect of the present invention, the cable release arrangement (cf. FIGS. 8 to 10) comprises a switching device or switching means including a reciprocally movable cam means having a cam portion and movable among a progressive series of selective switching positions, the cam portion being operatively connectable with the shutter of such a camera and adapted for correspondingly actuating the shutter segments and the diaphragm blades; a power storage spring or spring means having an initial tension condition and capable of undergoing a pressure load which increases its tension and of returning to its initial tension condition under a self-restoring force upon removal of such load and operatively connected with the cam means for undergoing such load upon moving the cam means from an initial switching position to a progressive switching position; a lock or lock means arranged for operatively releasably engaging the cam means at each switching position for maintaining the cam means at such position against the force of the spring; and an automatic cassette cable.

Such automatic cassette cable has an adjacent end operatively connected with the lock and a remote end operatively connectable to a film cassette accommodating lens carrier of such a camera, and is advantageously arranged for automatic actuation for releasing the lock upon insertion of such film cassette into the lens carrier, whereby to permit the spring to move the cam means in a direction back to its initial switching position.

More specifically, the cam means is provided with a series of biassing stop notches selectively positioned thereon at progressive positions corresponding to the switching positions, and the lock is provided with a locking portion cooperating with the stop notches and arranged for operative releasable locking engagement with each respective stop notch to maintain the cam means at a selective switching position corresponding to a particular stop notch, each stop notch having opposed biassing slope sides extending from the innermost point of the notch to the adjacent periphery of the cam means and which define corresponding biassing angles of selectively different values relative to a common line normal to the path of movement of the cam means and extending through the innermost point.

In this way, the corresponding steeper slope side and opposing shallower or less steep slope side of each such notch may be advantageously disposed for respectively resisting and facilitating displacement of the lock therefrom as earlier discussed.

Lastly, in accordance with an overall combination aspect of the present invention, a camera shutter or shutter mechanism arrangement (cf. FIGS. 11 to 14) is provided, for a camera of the type having a viewable ground glass focussing screen and which is connectable to a cable release of the foregoing type for operating the shutter or shutter mechanism arrangement.

Such camera shutter or camera shutter mechanism arrangement comprises a system of shutter segments which are selectively actuatable between a closed shutter position and an open shutter position and a system of diaphragm blades which are selectively adjustable to a preselected width or size aperture and which are selectively actuatable between a preselected width or size aperture position and a fully open aperture position; and a progressive actuating device adapted for operative connection with such a cable release for progressive actuation by the cable release and operatively connected with the shutter segment system and the diaphragm blade system for actuating such systems correspondingly temporarily to open shutter position and fully open aperture position to enable the user of such a camera to view the ground glass focussing screen thereof prior to taking a photograph.

The actuating device advantageously includes a setting mechanism progressively actuatable by such cable release and arranged for progressive or successive reciprocal movement under the actuating force of such cable release and provided with a differential spring deflector or deflector means operatively connected with the shutter segment system and the diaphragm blade system for acting thereon in a differential manner during such progressive or successive movement, such that in a first progressive movement phase of the deflector the shutter segments are actuated from closed to open shutter position while the diaphragm blades remain at the preselected width or size aperture position, and such that in a second progressive movement phase of the deflector the diaphragm blades are actuated from the preselected width or size aperture position to the fully open aperture position while the shutter segments remain at the open shutter position.

More specifically, a stationary segment system stop and a stationary blade system stop are provided, the shutter segment system includes a segment driving member for driving the shutter segments and arranged for movement from an initial position corresponding to the closed shutter position to an end position at the stationary segment stop corresponding to the open shutter position, the diaphragm blade system includes a blade driving member for driving the diaphragm blades and arranged for movement from an initial position corresponding to the preselected width or size aperture position to an end position at the stationary blade stop corresponding to the fully open aperture position, and the spring deflector includes a segment deflector member or part arranged for acting on the segment driving member, a blade deflector member or part arranged for acting on the blade driving member, and a pretensioned spring.

The differential spring deflector members or parts are advantageously operatively interconnected for relative movement with respect to each other during such progressive or successive movement and are normally resiliently maintained by the pretensioned spring in frictional engagement with each other, such that during initial progressive actuation by the cable release in the first movement phase the segment deflector member and blade deflector member move together, e.g. substantially simultaneously, and the segment deflector member also correspondingly moves the segment driving member over a specific path of travel defined between the initial position of the segment driving member and the end position thereof at the segment stop, and such that during further progressive actuation by the cable release in the second movement phase the blade deflector member further moves alone against the force of the pretensioned spring while the segment deflector member is prevented by the segment stop from further movement and the blade deflector member also correspondingly moves the blade driving member over a specific path of travel defined between the initial position of the blade driving member and the end position thereof at the blade stop.

More specifically, with regard to a lost motion interconnection feature (cf. FIGS. 12 to 14) in accordance with this overall combination aspect of the present invention, a rigidly mounted pivotal transmission lever is operatively connected with the blade driving member for moving the blade driving member, the segment deflector member is in the form of a pivotal two armed lever, the blade deflector member is in the form of a pivotal double linkage lever, the two armed lever and double linkage lever are rotatably coaxially independently mounted on a common stationary axis of pivot and maintained by the pretensioned spring in such frictional engagement with each other, and the differential spring deflector or deflector means further includes a driving connector operatively linkably interconnecting the double linkage lever with the transmission lever, the driving connector and transmission lever being arranged for permitting the two armed lever and double linkage lever to move independently of each other against the force of the pretensioned spring.

Preferably, the driving connector includes a coupling rod having one end thereof articulatedly connected to the double linkage lever and the other end thereof linkably connected to the transmission lever by means of an interposed pin and slot guide arrangement which permits a corresponding full opening and closing movement of the shutter segment system and of the diaphragm blade system.

More particularly, the pin and slot guide arrangement includes a longitudinal guide slot in which a corresponding guide pin is guided which is selectively longer in linear slot amplitude than that of the overall cumulative path of travel resulting from the sum of the corresponding amplitude of the individual paths of travel of the segment driving member and blade driving member during a complete actuation of the actuating device by the cable release.

Here again, stated another way, in accordance with such overall combination aspect of the present invention, the camera shutter or shutter mechanism arrangement (cf. FIGS. 11 to 14) comprises a system of shutter segments actuatable between a closed and an open shutter position and a system of diaphragm blades adjustable to a preselected width or size aperture and actuatable between a preselected width or size aperture position and a fully open aperture position, and a progressive actuating device including a differential spring deflector or deflector means adapted for operative connection with such a cable release progressive actuation by the cable release and arranged for progressive or successive reciprocal movement under the actuating force of such cable release and in turn operatively connected with the shutter segment system and the diaphragm blade system for acting thereon in a differential manner during such progressive or successive movement for actuating such systems correspondingly temporarily to open shutter position and fully open aperture position to permit the viewing of the ground glass focussing screen of such a camera prior to taking a photograph.

The differential spring deflector and the shutter segment system and diaphragm blade system advantageously are arranged with respect to each other such that in a first progressive movement phase of the deflector the shutter segments are actuated from closed to open shutter position while the diaphragm blades remain at the preselected width or size aperture position, and such that in a second progressive movement phase of the deflector the diaphragm blades are actuated from the preselected width or size aperture position to the fully open aperture position while the shutter segments remain at the open shutter position.

More specifically, the shutter segment system includes a segment driver for driving the shutter segments and arranged for movement along a limited segment path from an initial position corresponding to the closed shutter position to an end position corresponding to the open shutter position, the diaphragm blade system includes a blade driver for driving the diaphragm blades and arranged for movement along a limited blade path from an initial position corresponding to the preselected width or size aperture position to an end position corresponding to the fully open aperture position, and the differential spring deflector or deflector means includes a segment deflector member or part arranged for acting on the segment driver, a blade deflector member or part arranged for acting on the blade driver, and a pretensioned spring.

Advantageously, the deflector members are operatively interconnected for relative movement with respect to each other during such progressive movement and are normally maintained by the pretensioned spring for common movement together, such that during initial progressive actuation by the cable release in the first movement phase the segment deflector member and the blade deflector member move together and the segment deflector member also correspondingly moves the segment driver along the segment path to the end position thereof, and such that during further progressive actuation by the cable release in the second movement phase the blade deflector member further moves alone against the force of the pretensioned spring while the segment deflector member remains at the end position thereof and the blade deflector member also correspondingly moves the blade driver along the blade path to the end position thereof.

Preferably, the segment deflector member is in the form of a pivotal segment lever, the blade deflector member is in the form of pivotal blade lever, the segment lever and blade lever are coaxially independently mounted on a common stationary axis of pivot and normally maintained by the pretensioned spring for such common movement together, and adjustable amphitude lost motion linkage means, e.g. including a pin and guide slot connection, are included for operatively interconnecting the blade lever with the blade driver. The lost motion linkage means are suitably arranged in this regard for permitting the segment lever and blade lever to move independently of each other against the force of the pretensioned spring, whereby in turn upon actuation by the cable release, in the first movement phase the segment lever is able to move the segment driver along the segment path and the blade lever is able to move via the lost motion linkage means without corresponding movement of the blade driver, and in the second movement phase the blade lever is able to move the blade driver along the blade path via such lost motion linkage means without corresponding further movement of the segment lever and segment driver.

More particularly, the lost motion linkage means are preferably provided with a corresponding lost motion linear amplitude which is selectively longer than that of the overall cumulative path or tandem path resulting from the sum of the corresponding amplitude of the segment path and blade path, whereby to provide a camera user discernible neutral phase interval between the end of the first movement phase corresponding to the segment path and the start of the second movement phase corresponding to the blade path, i.e. at which point the shutter segments are at the open shutter position and the diaphragm blades are at the preselected width or size aperture position and prior to their movement to the fully open aperture position.

It will be appreciated that the foregoing specification and accompanying drawings are set forth by way of illustration and not limitation, and that various modifications and changes may be made therein without departing from the spirit and scope of the present invention which is to be limited solely by the scope of the appended claims.

What is claimed is:

1. Cable release arrangement, which is connectable to the shutter of a camera having an objective aperture provided with shutter segments releasable to take a photograph and actuatable between a closed and an open shutter position and with diaphragm blades actuatable between a preselected size aperture position and a fully open aperture position, comprising a housing forming a common actuating handle, a switching device operatively arranged on the housing, first and second flexible power transmitting members, each member having an adjacent end provided with an end piece disposed on the housing and a remote end provided with a shutter connection for operatively connecting the corresponding member to the shutter of such a camera, the first member being adapted for effecting release of the shutter segments to take a photograph, and being provided with a first axially displaceably mounted push rod which is guided in the end piece of the first member and arranged on the housing for finger pressure direct actuation to displace the first push rod for effecting in turn such release of the shutter segments, and the second member being adapted for correspondingly actuating the shutter segments and the diaphragm blades to view the field of the camera through the objective aperture of the shutter, and being provided with a second axially displaceably mounted push rod which is guided in the end piece of the second member and operatively connected with the switching device for indirect actuation by the switching device to displace progressively the second push rod for correspondingly actuating in turn the shutter segments and the diaphragm blades.

2. Arrangement according to claim 1 wherein the switching device includes a rotatably mounted cam disc having a progressive multi-stepped lifting cam, a switching lever arranged for manually rotating the cam disc among a progressive series of switching positions, and a power transmitting lever operatively interconnecting the lifting cam and the second push rod and arranged for displacement by the lifting cam upon rotation of the cam disc for corresponding pressure loading and pressure relieving operative actuation of the shutter segments and the diaphragm blades in dependence upon the direction of rotation of the cam disc.

3. Arrangement according to claim 2 wherein the power transmitting lever is in the form of an angle lever having a cam lever arm disposed in operative engagement with the lifting cam and a rod lever arm disposed in operative engagement with the second push rod.

4. Arrangement according to claim 3 wherein an automatic cassette cable is included having an adjacent end disposed on the housing and a remote end operatively connectable to a film cassette accommodating lens carrier of such a camera, and provided with an axially displaceably mounted cassette push rod operatively connected at the adjacent end of the cable with the switching device and arranged for actuating the switching device for indirectly actuating the second push rod and arranged at the remote end of the cable for automatic actuation by such a film cassette during corresponding insertion of such film cassette in such lens carrier for corresponding actuation in turn of the switching device and second push rod.

5. Arrangement according to claim 4 wherein an actuating spring is operatively connected with the power transmitting lever and arranged for urging the rod lever arm against the second push rod under the spring force of the actuating spring and also for urging the cam lever arm into frictional contact with the lifting cam under such spring force, the cassette push rod being arranged for coaction with the power transmitting lever under such spring force such that upon insertion of a film cassette into the lens carrier the cassette push rod is actuated thereby to counteract such spring force and such that upon removal of such film cassette from the lens carrier the cassette push rod is actuated by the power transmitting lever under such spring force.

6. Arrangement according to claim 5 wherein the cam disc is provided with a series of stop notches selectively positioned thereon remote from the lifting cam, and a rigidly mounted and spring loaded stop lever is disposed on the housing for operative releasable engagement with a particular stop notch to maintain the cam disc at a selective switching position.

7. Arrangement according to claim 6 wherein the switching lever is arranged for movement along a visible switching path on the housing among a progressive series of switching positions corresponding to those of the cam disc, and a corresponding picture symbol is disposed adjacent the switching path at each such switching position which indicates the concordant position of the shutter segments and of the diaphragm blades at the objective aperture of the shutter of the camera corresponding to such switching position.

8. Cable release arrangement, which is connectable to the shutter of a camera having shutter segments actuatable between a closed and an open shutter position and diaphragm blades actuatable between a preselected size aperture position and a fully open aperture position, comprising a switching device including a rotatably mounted cam disc having a cam portion operatively connectable with the shutter of such camera and adapted for correspondingly actuating the shutter segments and the diaphragm blades, and a switching lever arranged for rotating the cam disc among a progressive series of switching positions, a power storage spring having an initial tension condition and capable of undergoing a pressure load which increases its tension and of returning to its initial tension condition under a self-restoring force upon removal of such load and operatively connected with the cam disc for undergoing such load upon rotating the cam disc by the switching lever from an initial switching position to a progressive switching position, a lock arranged for operatively releasably engaging the cam disc at each switching position for maintaining the cam disc at such position against the force of the spring, and an automatic cassette cable having an adjacent end operatively connected with the lock and a remote end operatively connectable to a film cassette accommodating lens carrier of such a camera, and arranged for automatic actuation for releasing the lock upon insertion of such film cassette into the lens carrier, whereby to permit the spring to rotate the cam disc in a direction back to its initial switching position.

9. Arrangement according to claim 8 wherein the cam disc is provided with a series of stop notches selectively positioned thereon at progressive positions corresponding to the switching positions, and the lock is in the form of a lever having a releasing lever portion operatively connected with the automatic cassette cable for releasing the lock and a locking lever portion cooperating with the stop notches and arranged for operative releasable locking engagement with each respective stop notch to maintain the cam disc at a selective switching position corresponding to a particular stop notch, each stop notch having opposed slope sides extending from the innermost point of the notch to the adjacent periphery of the cam disc and which define corresponding angles of selectively different values relative to a common radial line extending from the corresponding axis of rotation of the cam disc through the innermost point.

10. Arrangement according to claim 8 wherein the power storage spring is in the form of a tension spring.

11. Cable release arrangement, which is connectable to the shutter of a camera having an objective aperture provided with shutter segments releasable to take a photograph and actuatable between a closed and an open shutter position and with diaphragm blades actuatable between a preselected size aperture position and a fully open aperture position, comprising a housing forming a common actuating handle, a switching device operatively arranged on the housing, first linear motion transmitting means having an adjacent end disposed on the housing and a remote end operatively connectable to the shutter of such a camera, and provided with a finger operated linearly displaceable first actuator having an adjacent end operatively arranged on the housing for finger displacement thereof and a remote end operatively arranged for effecting release of the shutter segments to take a photograph upon such finger displacement, and second linear motion transmitting means having an adjacent end disposed on the housing and a remote end operatively connectable to the shutter, and provided with a switching device operated linearly displaceable second actuator having an adjacent end operatively connected with the switching device for progressive displacement thereof by the switching device and a remote end operatively arranged for correspondingly progressively actuating in turn the shutter segments and the diaphragm blades to view the field of the camera through the objective aperture of the shutter upon such progressive displacement.

12. Arrangement according to claim 11 wherein the switching device includes a reciprocally movable cam means having a progressive multi-stepped cam portion and movable among a progressive series of switching positions, and cam follower means operatively interconnecting the cam portion and the second actuator and arranged for corresponding pressure loading and pressure relieving operative actuation of the shutter segments and the diaphragm blades in dependence upon the direction of reciprocal movement of the cam means.

13. Arrangement according to claim 11 wherein an automatic cassette cable is included having an adjacent end disposed on the housing and a remote end operatively connectable to a film cassette accommodating lens carrier of such a camera, and provided with a linearly displaceable cassette push rod operatively connected at the adjacent end of the cable with the switching device and arranged for actuating the switching device for indirectly actuating the second actuator and arranged at the remote end of the cable for automatic actuation by such a film cassette during corresponding insertion of the film cassette in such lens carrier for corresponding actuation in turn of the switching device and second actuator.

14. Arrangement according to claim 13 wherein the switching device includes a reciprocally movable cam means having a progressive multi-stepped cam portion and movable among a progressive series of switching positions, cam follower means operatively interconnecting the cam portion and the second actuator and arranged for corresponding pressure loading and pressure relieving operative actuation of the shutter segments and the diaphragm blades in dependence upon the direction of reciprocal movement of the cam means, and an actuating spring operatively connected with the cam follower means and arranged for urging the cam follower against the second actuator under the spring force of the actuating spring and also for urging the cam follower means into frictional contact with the cam portion, the cassette push rod being arranged for coaction with the cam follower means under such spring force, such that upon insertion of a film cassette into the lens carrier the cassette push rod is actuated thereby to counteract such spring force and such that upon removal of such film cassette from the lens carrier the cassette push rod is actuated by the cam follower means under such spring force.

15. Cable release arrangement, which is connectable to the shutter of a camera having shutter segments actuatable between a closed and an open shutter position and diaphragm blades actuatable between a preselected size aperture position and a fully open aperture position, comprising a switching device including a reciprocally movable cam means having a cam portion and movable among a progressive series of switching positions, the cam portion being operatively connectable with the shutter of such a camera and adapted for correspondingly actuating the shutter segments and the diaphragm blades, a power storage spring having an initial tension condition and capable of undergoing a pressure load which increases its tension and of returning to its initial tension condition under a self-restoring force upon removal of such load and operatively connected with the cam means for undergoing such load upon moving the cam means from an initial switching position to a progressive switching position, a lock arranged for operatively releasably engaging the cam means at each switching position for maintaining the cam means at such position against the force of the spring, and an automatic cassette cable having an adjacent end operatively connected with the lock and a remote end operatively connectable to a film cassette accommodating the lens carrier of such a camera, and arranged for automatic actuation for releasing the lock upon insertion of such film cassette into the lens carrier, whereby to permit the spring to move the cam means in a direction back to its initial switching position.

16. Arrangement according to claim 15 wherein the cam means is provided with a series of stop notches selectively positioned thereon at progressive positions corresponding to the switching positions, and the lock is provided with a locking portion cooperating with the stop notches and arranged for operative releasable locking engagement with each respective stop notch to maintain the cam means at a selective switching position corresponding to a particular stop notch, each stop notch having opposed slope sides extending from the innermost point of the notch to the adjacent periphery of the cam means and which define corresponding angles of selectively different values relative to a common line normal to the path of movement of the cam means and extending through the innermost point.

* * * * *